United States Patent
Choi et al.

(10) Patent No.: US 9,310,954 B2
(45) Date of Patent: Apr. 12, 2016

(54) APPARATUS AND METHOD FOR MANUFACTURING A TOUCH SCREEN PANEL

(75) Inventors: Hyung Bae Choi, Mungyeong-si (KR); Sung Jin Ryu, Cheongju-si (KR); Ki Won Park, Anyang-si (KR); Ung Sang Lee, Cheongju (KR)

(73) Assignee: MIRAENANOTECH CO., LTD., Chungcheongbuk-Do (KR)

( * ) Notice: Subject to any disclaimer, the term of this patent is extended or adjusted under 35 U.S.C. 154(b) by 30 days.

(21) Appl. No.: 14/233,872

(22) PCT Filed: Jul. 19, 2012

(86) PCT No.: PCT/KR2012/005756
§ 371 (c)(1),
(2), (4) Date: Jan. 20, 2014

(87) PCT Pub. No.: WO2013/012260
PCT Pub. Date: Jan. 24, 2013

(65) Prior Publication Data
US 2014/0134328 A1    May 15, 2014

(30) Foreign Application Priority Data

Jul. 21, 2011 (KR) .................. 10-2011-0072213
Mar. 14, 2012 (KR) .................. 10-2012-0026120

(51) Int. Cl.
B05C 1/04    (2006.01)
G06F 3/045   (2006.01)
G06F 3/044   (2006.01)

(52) U.S. Cl.
CPC ............... *G06F 3/045* (2013.01); *G06F 3/044* (2013.01); *B05C 1/04* (2013.01); *G06F 2203/04103* (2013.01); *G06F 2203/04112* (2013.01)

(58) Field of Classification Search
None
See application file for complete search history.

(56) References Cited

U.S. PATENT DOCUMENTS 952,687 A * 3/1910 Rosen ............................ 101/417
5,289,774 A * 3/1994 Stanka ........................... 101/423
5,674,556 A * 10/1997 Fukumura et al. ............. 427/113

FOREIGN PATENT DOCUMENTS

JP    2010-182137 A    8/2010
KR    10-2010-0024128 A    3/2010
(Continued)

OTHER PUBLICATIONS

English translation of Murano (JP 2004-098500).*
(Continued)

*Primary Examiner* — Charles Capozzi

(57) ABSTRACT

The apparatus for manufacturing the touch screen panel according to the present invention includes: a first roll by which a wound film is unwound; a second roll around which a film having an electrode pattern is wound; a guide roll disposed between the first and second rolls to guide the transfer of the film; a resin applying part applying a resin on the film to form a resin layer; a pattern molding part including a mold having a relief pattern and pressing the mold onto the resin layer to form an intaglio pattern on the resin layer; an electrode material applying part applying an electrode material on a surface of the resin; an electrode material sweeping part removing the electrode material from the surface of the resin layer; and a hardening part hardening the electrode material filled in the intaglio pattern of the resin surface.

16 Claims, 13 Drawing Sheets

(56) References Cited

FOREIGN PATENT DOCUMENTS

| KR | 10-0959907 B1 | 5/2010 |
| KR | 10-2011-0000886 A | 1/2011 |

OTHER PUBLICATIONS

English translation of Taniguchi (JP 2010-228104).*
International Search Report for PCT/KR2012/005756, filed on Jul. 19, 2012.

* cited by examiner

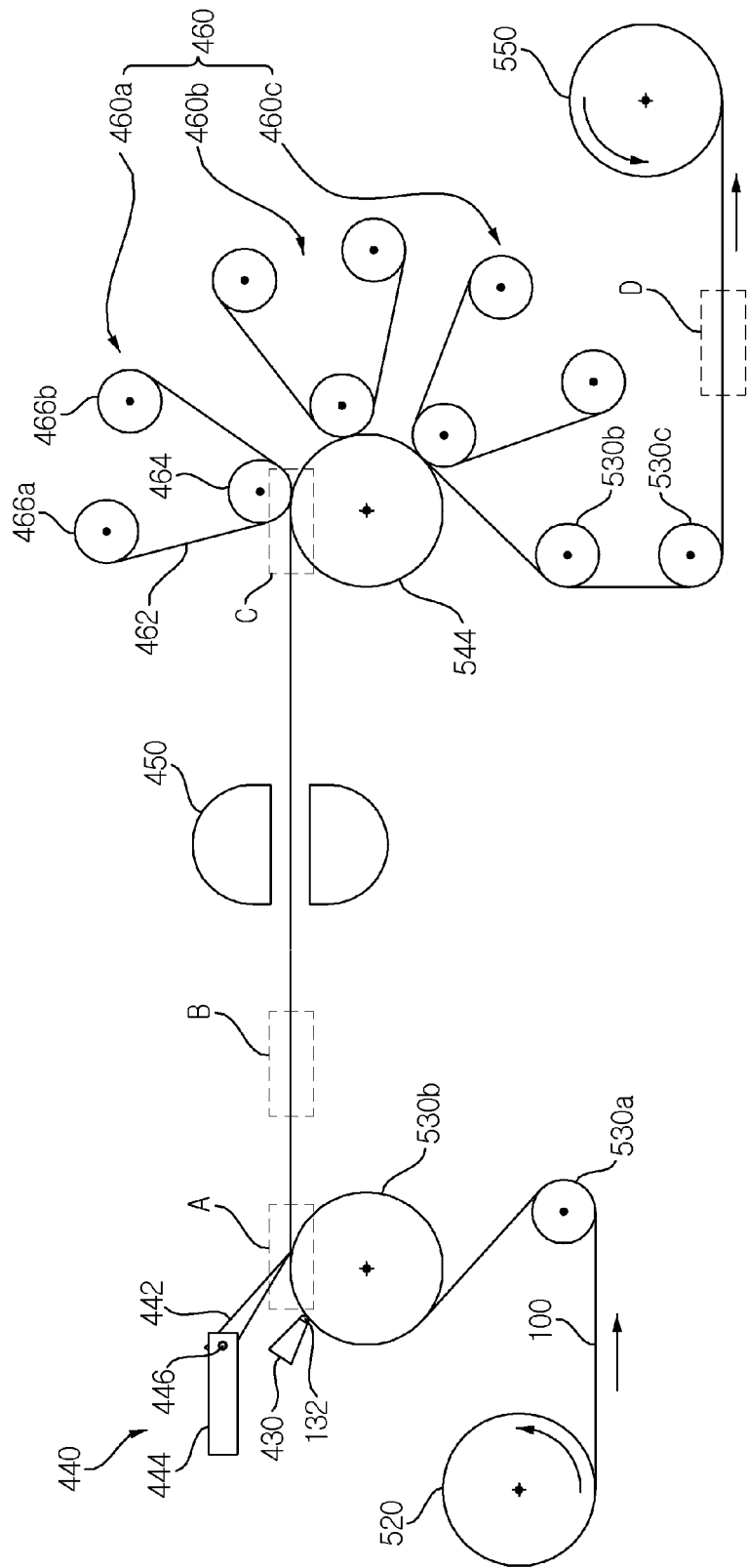

APPARATUS AND METHOD FOR MANUFACTURING A TOUCH SCREEN PANEL

TECHNICAL FIELD

The present invention relates to an apparatus and a method for manufacturing a touch screen panel, and more particularly, to an apparatus and a method for manufacturing a touch screen panel capable of automatically manufacturing a touch screen panel by a roll-to-roll method.

BACKGROUND ART

A touch screen apparatus means an input apparatus for sensing a touch position of a user on a display screen to perform an overall control of an electronic device including a display screen control.

The touch screen apparatus includes a resistive type, a capacitive type, an ultrasonic type, an optical (infrared) sensor type, an electromagnetic type, and the like. Since the touch screen apparatuses have characteristics that a problem of signal amplification, a resolution difference, and a difference in a difficulty level of designing and processing techniques are varied according to each type, the touch screen apparatuses are divided into several types to maximize the merits and the corresponding type is selected. In detail, selection of an operation type thereof is performed by considering durability and economical efficiency and the like in addition to an optical property, a mechanical property, an anti-environment characteristic, and a pressure characteristic.

The touch screen panel is manufactured by forming a transparent electrode pattern in a state where a transparent electrode film is cut in a sheet form. However, since the method of manufacturing the touch screen panel by cutting the transparent electrode film in the sheet form is manually performed, there is a problem in that productivity is extremely deteriorated. When the transparent electrode film is manually cut in the sheet form to manufacture the touch screen panel, possibility that a foreign substance is introduced in the touch screen panel is high, and thus there is a problem in that an error rate increases.

DETAILED DESCRIPTION OF THE INVENTION

Technical Problem

The present invention has been made in an effort to provide apparatus and method for manufacturing a touch screen panel capable of improving productivity of the touch screen panel by automatically manufacturing the touch screen panel.

Further, the present invention has been made in an effort to provide apparatus and method for manufacturing a touch screen panel capable of reducing an error rate of the touch screen panel by automatically manufacturing the touch screen panel.

In addition, the present invention has been made in an effort to provide apparatus and method for manufacturing a touch screen panel that form an electrode pattern by a method of filling an electrode material in an engraved pattern.

Technical Solution

An exemplary embodiment of the present invention provides an apparatus for manufacturing a touch screen panel by forming an electrode pattern on a substrate with an engraved pattern, the apparatus including: a first roll on which the substrate is rewound; a second roll on which the substrate with the electrode pattern is transferred and rewound; a guide roll provided on a transfer path of the substrate between the first roll and the second roll and configured to guide transfer of the substrate; an electrode material coating unit installed on the transfer path of the substrate and configured to coat an electrode material on the substrate; and an electrode material sweeping unit installed at the rear of the electrode material coating unit in a transfer direction of the substrate and configured to push the electrode material on the surface of the substrate and fill the pushed electrode material in the engraved pattern by contacting the surface of the substrate and applying a predetermined pressure to the substrate.

Another exemplary embodiment of the present invention provides a method for manufacturing a touch screen panel by forming an electrode pattern on a substrate with an engraved pattern, the method including: (a) transferring the substrate from a first roll to a second roll; (b) coating an electrode material on the substrate transferred to the second roll by an electrode material coating unit; and (c) pushing the electrode material on the surface of the substrate of the electrode material coated on the substrate by an electrode material sweeping unit in an opposite direction to a transfer direction of the substrate and filling the pushed electrode material in an engraved pattern.

Advantageous Effects

According to the exemplary embodiments of the present invention, since a touch screen panel is automatically manufactured by a roll-to-roll method, the touch screen panel can be continuously manufactured, thereby making it possible to largely improve productivity of the touch screen panel.

According to the exemplary embodiments of the present invention, since a touch screen panel is automatically manufactured by a roll-to-roll method, quality of the touch screen panel is uniformized, thereby making it possible to largely reduce an error rate.

The foregoing summary is illustrative only and is not intended to be in any way limiting. In addition to the illustrative aspects, embodiments, and features described above, further aspects, embodiments, and features will become apparent by reference to the drawings and the following detailed description.

DESCRIPTION OF DRAWINGS

FIG. 6 is a diagram illustrating an overall configuration of an apparatus for manufacturing a touch screen panel according to the exemplary embodiment of the present invention.

Figure 1:
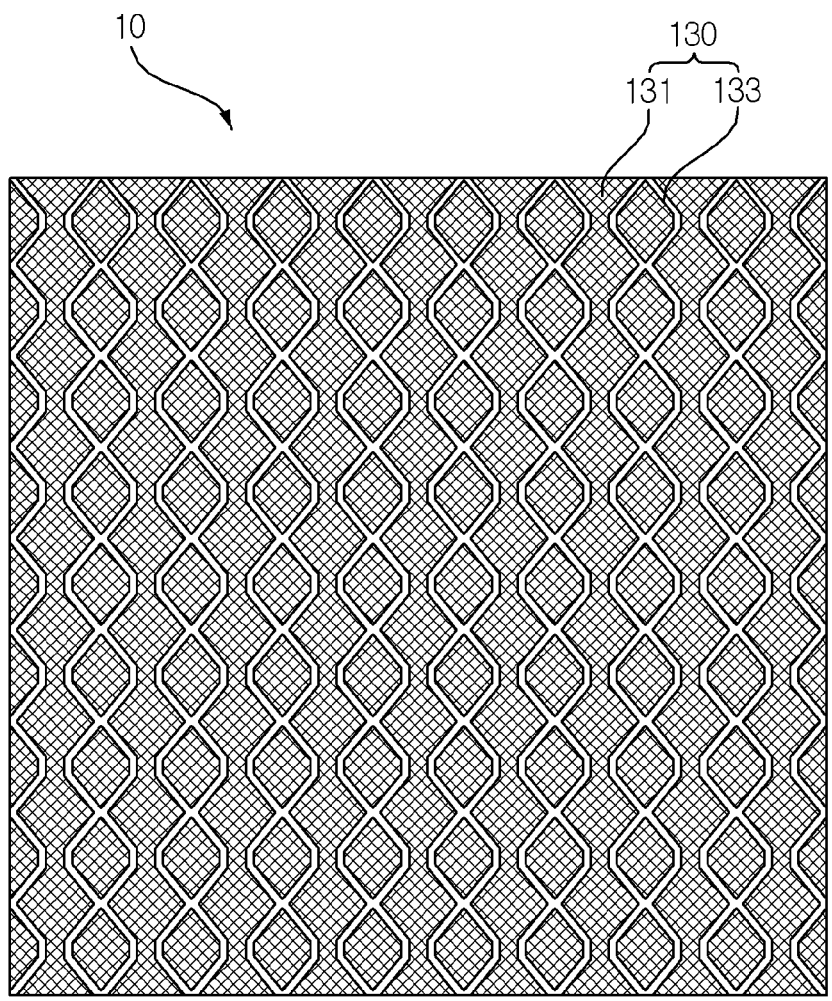
FIG. 1 is a diagram illustrating an example of a touch screen panel manufactured by a method for manufacturing a touch screen panel according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

MODE FOR THE INVENTION

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. In describing the present invention, well-known functions or constructions will not be described in detail since they may unnecessarily obscure the understanding of the present invention. It should be understood that although exemplary embodiment of the present invention are described hereafter, the spirit of the present invention is not limited thereto and may be changed and modified in various ways by those skilled in the art.

Figure 2:
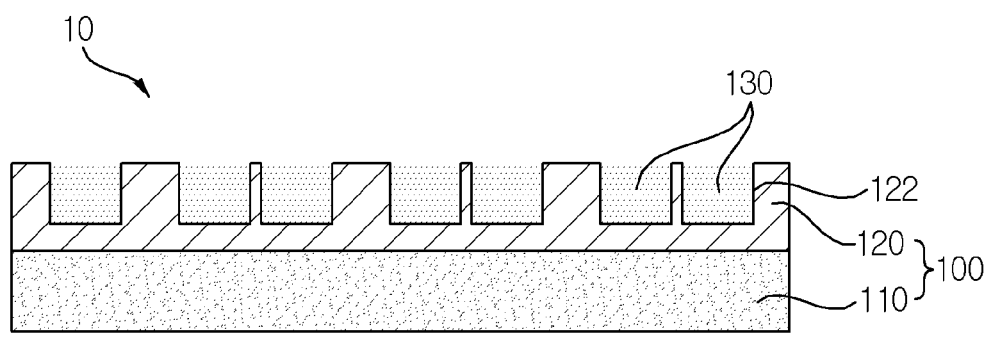
FIG. 2 is a longitudinally cross-sectional view illustrating an example of a touch screen panel manufactured by the method for manufacturing a touch screen panel according to the exemplary embodiment of the present invention.

FIG. 1 is a diagram illustrating an example of a touch screen panel manufactured by a method for manufacturing a touch screen panel according to an exemplary embodiment of the present invention, and FIG. 2 is a longitudinally cross-sectional view illustrating an example of a touch screen panel manufactured by the method for manufacturing a touch screen panel according to the exemplary embodiment of the present invention.

Figure 3A:
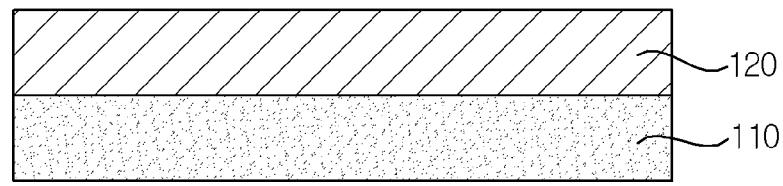
FIGS. 3A and 3B are diagrams sequentially illustrating a process of forming an engraved pattern on a resin layer which is laminated on a base film used in the method for manufacturing a touch screen panel according to the exemplary embodiment of the present invention.
Figure 3B:
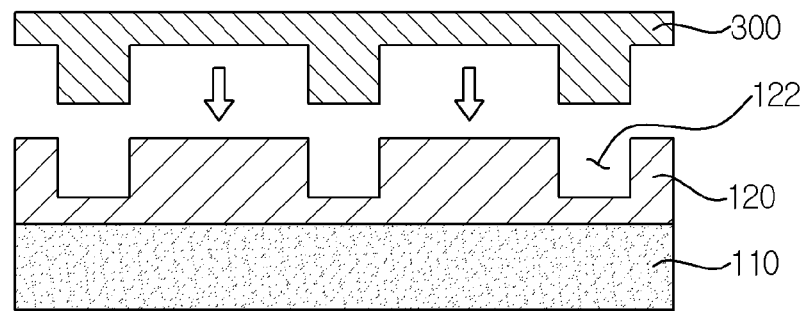
Figure 4A:
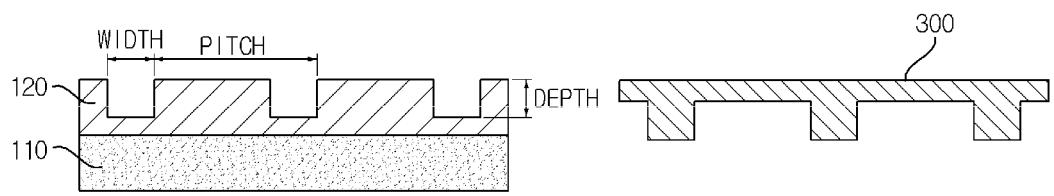
FIGS. 4A to 4C are diagrams illustrating longitudinal section shapes of molds having various shapes to form an engraved pattern on a resin layer and engraved patterns formed by the corresponding molds.
Figure 4B:
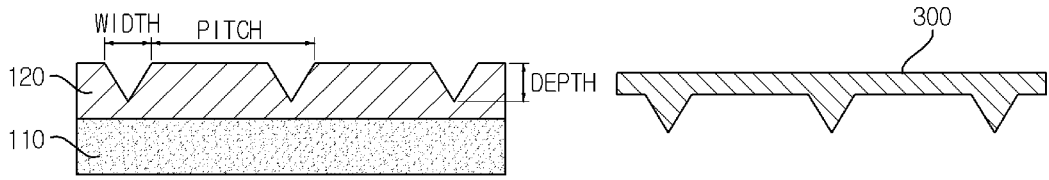
Figure 4C:
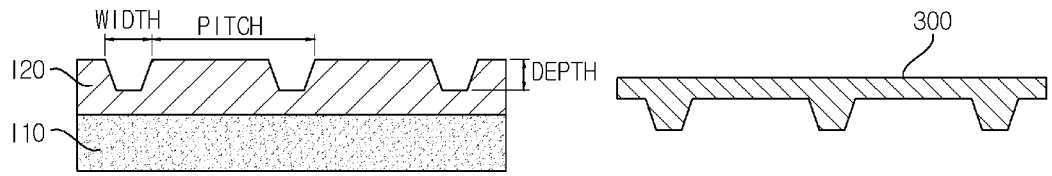

FIGS. 3A and 3B are diagrams sequentially illustrating a process of forming an engraved pattern on a resin layer which is laminated on a base film used in the method for manufacturing a touch screen panel according to the exemplary embodiment of the present invention, and FIGS. 4A to 4C are diagrams illustrating longitudinal section shapes of molds having various shapes to form an engraved pattern on a resin layer and engraved patterns formed by the corresponding molds.

Referring to FIGS. 1 and 2, a touch screen panel 10 manufactured by a method for manufacturing a touch screen panel according to an exemplary embodiment of the present invention includes a substrate 100, an engraved pattern 122, and an electrode pattern 130. In the method and apparatus for manufacturing a touch screen panel according to the present invention, an electrode material is filled in the engraved pattern 122 formed on the substrate 100 to form the electrode pattern 130.

The substrate 100 used in the present invention may include a base film 110 and a resin layer 120.

The base film 110 is a base having a predetermined transparency, and may be manufactured by a resin film. A resin which may be used as a material of the base film 110 may include resins such as polyethylene terephthalate (PET), polycarbonate (PC), polymethylmethacryate (PMMA), polyimide (PI), acryl, polyethylene naphthalate (PEN), triacetate cellulose (TAC), and polyethersulfone (PES). A thickness of the base film 110 may be in the range of, for example, 25 to 250 μm, and light transmittance may be 80% or more and more preferably 90% or more.

The resin layer 120 is laminated on the base film 110, and the engraved pattern 122 filled with the electrode material is formed on the upper surface thereof. The resin layer 120 may be made of an ultraviolet (UV) resin or a thermosetting resin, in which a resin having predetermined viscosity and mobility is cured. As illustrated in FIGS. 3A and 3B, the engraved pattern 122 formed on the resin layer 120 is formed by pressing an embossed mold having a shape corresponding to a desired cross-sectional shape on the resin layer. That is, the engraved pattern 122 is formed on the resin layer 120 by imprinting a mold with an embossed pattern on the resin layer. Accordingly, one or more engraves form a predetermined pattern.

A width of the engraved pattern 122 may be in the range of 1 μm to 10 μm on the resin layer 120, a depth of the engraved pattern 122 may be in the range of 1 μm to 10 μm, and a pitch between the engraved pattern 122 and the adjacent engraved pattern 122 may be in the range of 200 μm to 600 μm. Of course, a structure of the engraved pattern 122 may be variously modified according to the need of a user.

In the case of using a UV curing resin or thermosetting resin as the resin layer 120, after a mold 300 is pressed on the resin layer 120 before curing and the resin layer 120 is cured by applying heat in the pressed state, the mold 300 is removed to form the engraved pattern 122. In this case, it is preferred that the mold 300 for forming the engraved pattern 122 on the resin layer 120 uses a material having sufficiently low surface roughness so that a haze after patterning the engraved pattern 122 is 4% or less. Meanwhile, in order to smoothly separate the mold 300 and the resin layer 120 from each other, surface treatment may be performed on the surface of the mold 300 before imprinting the mold 300. As an example of the surface treatment, treatment using $SiO_2$ having a thickness of 1,200 to 1,500 Å may be performed by a sputtering method, and various types of surface treatments may be performed.

The electrode pattern 130 may include a sensor electrode 131, and if necessary, may further include a dummy electrode 133. The sensor electrode 131 is formed in the engraved pattern 122 of the resin layer 120 and senses a contact position of a user contacting the touch screen panel 10. The dummy electrode 133 is formed to be electrically isolated from other electrodes so as not to influence a sensing function and an operating function of the sensor electrode 131 and formed in the engraved pattern 122 with the same line width and pitch as those of the engraved pattern 122 with the sensor electrode 131 or a line width and a pitch having a predetermined similarity. An emboss having the electrode pattern 130 of the touch screen panel 10 to be manufactured protrudes to form the mold 300. Referring to FIGS. 4A to 4C, a longitudinal section of the engraved pattern 122 of the resin layer 120 may have any one shape of, for example, a quadrangle, a triangle, and a trapezoid. As illustrated in FIG. 4A, when an embossed shape of the mold is a quadrangle, a shape of the engraved pattern 122 formed on the resin layer 120 is also a quadrangle, as illustrated in FIG. 4B, when the embossed shape of the mold is a triangle, the shape of the engraved pattern 122 formed on the resin layer 120 is also a triangle, and as illustrated in FIG. 4C, when the embossed shape of the mold is a trapezoid, the shape of the engraved pattern 122 formed on the resin layer 120 is also a trapezoid.

However, the substrate 100 is not limited to the structure and material described above, and may be implemented by various structures and materials which have a predetermined transparency and may form the engraved pattern 122.

Figure 8A:
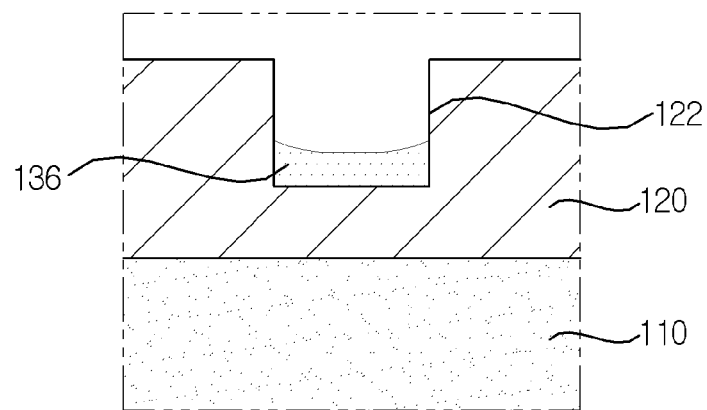
FIGS. 8A to 8C are diagrams sequentially illustrating a process of forming an electrode pattern by sequentially laminating silver, silver, and carbon black from the lower part in an engraved pattern.
Figure 8B:
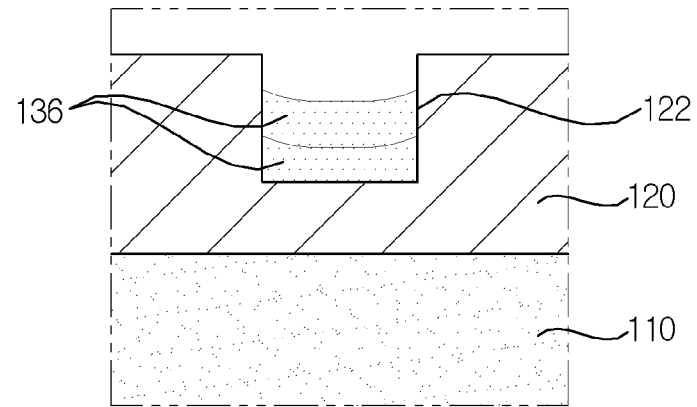
Figure 8C:
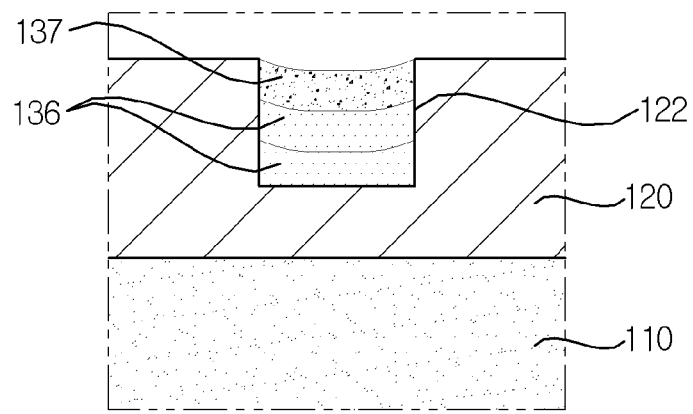

FIG. 6 is a diagram illustrating an overall configuration of an apparatus for manufacturing a touch screen panel according to the exemplary embodiment of the present invention, and FIGS. 7A to 7D are enlarged views of parts A, B, C, and D of FIG. 6, respectively. FIGS. 8A to 8C are diagrams sequentially illustrating a process of forming an electrode pattern by sequentially laminating silver, silver, and carbon black in an engraved pattern. Hereinafter, the method for manufacturing a touch screen panel according to the exemplary embodiment of the present invention and the apparatus for manufacturing a touch screen panel according to the exemplary embodiment of the present invention in order to implement the method will be described with reference to FIGS. 5 to 8C.

In the present invention, as a principle of forming the electrode pattern 130, when the resin layer 120 with the engraved pattern 122 is coated with an electrode material 132 and then the electrode material 132 is removed from the surface of the resin layer 120, the electrode material 132 remains only in the engraved pattern 122 of the resin layer 120. As a result, the electrode material 132 filled in the engraved pattern 122 of the resin layer 120 forms the electrode pattern 130.

The electrode material may be a metallic material or a conductive material such as a conductive polymer, and for example, may be any one of copper (Cu), silver (Ag), silver-carbon (Ag—C), aluminum (Al), nickel (Ni), chromium (Cr), nickel-phosphorus (Ni—P), carbon black, and conductive black paste or a mixture thereof.

Hereinafter, an apparatus for manufacturing a touch screen panel according to the exemplary embodiment of the present invention will be described with reference to FIG. 6.

The apparatus for manufacturing a touch screen panel according to the exemplary embodiment of the present invention includes a first roll 520 on which the substrate 100 is rewound and the wound substrate 100 is unwound, a second roll 550 on which the substrate 100 with the electrode pattern is rewound, guide rolls 530a, 530b, and 530c provided between the first roll 520 and the second roll 550 and guiding a transfer of the substrate 100, a first support roll 542 and a second support roll 544 supporting the substrate 100, an electrode material coating unit 430 coating the electrode material 132 on the resin layer 120 of the substrate 100, an electrode material sweeping unit 440 removing the electrode material 132 from the surface of the resin layer 120, a curing unit 450 curing the electrode material 132 filled in the engraved pattern 122 of the resin layer 120, and a cleaning unit 460 cleaning the surface of the resin layer 120.

The electrode material coating unit 430, the electrode material sweeping unit 440, the curing unit 450, and the cleaning unit 460 are sequentially disposed between the first roll 520 and the second roll 550 in a transfer direction of the substrate.

The first roll 520 and the second roll 550 are provided at both ends of the apparatus for manufacturing a touch screen panel according to the exemplary embodiment of the present invention, respectively and rotate, and the substrate 100 rewound on the first roll 520 is continuously transferred in a state where both ends thereof are hung up on the first roll 520 and the second roll 550 to be rewound on the second roll 550.

The guide rolls 530a, 530b, and 530c are provided on a transfer path of the substrate between the first roll 520 and the second roll 550 and guide the transfer of the substrate 100. The guide rolls 530a, 530b, and 530c may be divided into a first guide roll 530a, a second guide roll 530b, and a third guide roll 530c according to an installed position, and of course, the number and positions of the guide rolls 530a, 530b, and 530c may be variously modified if necessary.

The electrode material coating unit 430 is installed on the transfer path of the substrate 100 to coat the electrode material 132 on the resin layer 120 of the substrate 100. The electrode material 132 may be continuously coated while the substrate 100 is transferred or may be discontinuously coated with a predetermined interval. An amount and a speed at which the electrode material 132 is coated may be determined by considering a transfer speed of the substrate 100, a width and a depth of the engraved pattern 122, viscosity of the electrode material 132, and the like. When the electrode material 132 is coated on the resin layer 120, a part of the electrode material 132 is filled in the engraved pattern 122 and the rest of the electrode material 132 remains on the surface of the resin layer 120. However, the electrode material sweeping unit 440 to be described below is provided and thus the electrode material 132 remaining on the surface of the resin layer 120 may be filled in the engraved pattern 122 of the resin layer 120.

The electrode material sweeping unit 440 is installed at the rear of the electrode material coating unit 430 in the transfer direction of the substrate 100. The electrode material sweeping unit 440 is in contact with the surface of the resin layer 120 to serve to push the electrode material 132 on the surface of the resin layer 120 of the electrode material 132 coated on the resin layer 120 and fill the pushed electrode material 132 in the engraved pattern 122. In other words, the electrode material 132 coated on the resin layer 120 is transferred together with the substrate 100, and when the electrode material 132 on the surface of the resin layer 120 reaches the electrode material sweeping unit 440, the electrode material 132 on the surface of the resin layer 120 is blocked by the electrode material sweeping unit 440 to be not transferred together with the substrate 100 and then be pushed in an opposite direction to the transfer direction of the substrate 100. While the electrode material 132 on the surface of the resin layer 120 is pushed by the electrode material sweeping unit 440, the electrode material 132 on the surface of the resin layer 120 is filled in the engraved pattern 122 by pressure applied by the electrode material sweeping unit 440.

The electrode material sweeping unit 440 may include a blade 442 and a blade arm 444. The blade arm 444 is installed at one side of the apparatus for manufacturing a touch screen panel so as to move in a vertical direction with respect to the substrate 100. The blade 442 is coupled with a rotating shaft 442 at one end of the blade arm 444 to rotate and may be fixed at a predetermined angle that a user wants. A width of the blade 442 may be larger than or the same as a width of the substrate 100, and a front end of the blade 442 contacts the substrate 100 at a predetermined angle throughout a width direction of the substrate 10. An angle formed by contacting the blade 442 and the substrate 100 may be an acute angle. The blade 442 may be made of a material capable of supplying a predetermined pressure to the substrate 100 which does not react with the electrode material 132 and has a predetermined hardness.

Since the front end of the blade 442 is in contact with the surface of the resin layer 120 at a predetermined angle, the electrode material sweeping unit 440 is fixed so as to apply the predetermined pressure to the substrate 100, to thereby prevent the electrode material 132 on the surface of the resin layer 120 from being transferred together with the substrate 100 while transferring the substrate 100 and fill the electrode material 132 on the surface of the resin layer 120 in the engraved pattern 122. In other words, the electrode material 132 on the surface of the resin layer 120 is blocked by the electrode material sweeping unit 440 due to relative movement of the electrode material sweeping unit 440 and the substrate 100 to be pushed from the surface of resin layer 120 and filled in the engraved pattern 122. The electrode material 132 is pushed in an opposite direction to the transfer direction of the substrate 100 by the electrode material sweeping unit 440 and thus the electrode material 132 is almost removed from the surface of the resin layer 120 of the substrate 100 which passes through the electrode material sweeping unit 440. In this case, the blade 442 contacts the substrate 100 to form an acute angle and thus the electrode material 132 on the surface of the resin layer 120 which is pushed by the blade 442 is effectively filled in the engraved pattern 122.

The blade 442 may be rotatably coupled with the blade arm 444 and may vertically move by the blade arm 444 at the same time to control an angle at which the blade 442 contacts the substrate 100 and a pressure applied to the substrate 100 by the blade 442. That is, the pressure which is applied to the substrate 100 by the electrode material sweeping unit 440 may be controlled by controlling the angle at which the blade 442 contacts the substrate 100, or controlling a vertical position of the blade arm 444. As the pressure which is applied to the substrate 100 by the electrode material sweeping unit 440 is stronger, the electrode material 132 on the surface of the resin layer 120 may be effectively removed, but in the case where the pressure of the electrode material sweeping unit 440 is excessively strong, there is a risk of damaging the substrate 100.

A first support roll 542 which supports the substrate 100 pressurized by the electrode material sweeping unit 440 is installed at an opposite side of the electrode material sweeping unit 440 with the substrate 100 therebetween. The substrate 100 is supported by the first support roll 542 to prevent the substrate 100 from hanging by the pressure of the electrode material sweeping unit 440, and to maintain a state in which the electrode material sweeping unit 440 is in close contact with the substrate 100.

The curing unit 450 is provided at the rear of the electrode material sweeping unit to cure the electrode material filled in the engraved pattern 122 of the resin layer 120 by irradiating heat, hot-wind, infrared or near-infrared on the substrate 100.

The cleaning unit 460 cleans the remaining electrode material on the surface of the resin layer 120. Although the electrode material 132 on the surface of the resin layer 120 is almost pushed by the electrode material sweeping unit 440 to be filled in the engraved pattern 122, a residue 135 of the electrode material 132 may remain on the surface of the resin layer 120. The cleaning unit 460 removes the residue 135 of the electrode material 132 which is not removed by the electrode material sweeping unit 440 and remains on the surface of the resin layer 120. The cleaning unit 460 includes a cleaning member 462, a first cleaning roll 466a, a second cleaning roll 466b, and a cleaning guide roll 464.

The cleaning member 462 is rewound between the first cleaning roll 466a and the second cleaning roll 466b and contacts the surface of the resin layer 120 to remove the residue 135 of the electrode material 132 which remains on the surface of the resin layer 120. The cleaning member 462 may be transferred in the same direction as or an opposite direction to the transfer direction of the substrate 100 while being rewound on the first cleaning roll 466a or the second cleaning roll 466b while the substrate 100 is transferred. The cleaning member 462 may not be transferred and held in a fixed state while the substrate 100 is transferred.

The cleaning member 462 is pressurized to the substrate 100 side by the cleaning guide roll 464 to contact the surface of the resin layer 120 and thus remove the residue 135 of the electrode material 132 which remains on the surface of the substrate 100. The second support roll 544 is installed at an opposite side of the cleaning guide roll 464 with the substrate 100 therebetween. The second support roll 544 supports the substrate 100 pressurized by the cleaning guide roll 464. The substrate 100 is supported by the second support roll 544 and thus the substrate 100 does not hang in a direction pressurized by the cleaning guide roll 464 and is held in close contact with the cleaning member 462. The second support roll 544 supplies transferring force to the substrate to transfer the substrate 100. Due to frictional force generated when the cleaning member 462 contacts the substrate 100, a transfer speed of the substrate 100 may be decreased at a point where the cleaning member 462 contacts the substrate 100. The substrate 100 needs to be transferred at the same speed at each point between the first roll 520 and the second roll 550, and if the transfer speed of the substrate 100 is decreased at a specific point, the substrate 100 may be deformed. Sufficient transferring force needs to be supplied to substrate 100 at the point where the substrate 100 contacts the cleaning member 462 so that the transfer speed of the substrate 100 at the point of contacting the cleaning member 462 may be maintained to be the same as a transfer speed at another point. In order to supply the transferring force to the substrate 100, sufficient frictional force needs to exist between the substrate 100 and the second support roll 544. In order to improve the frictional force between the substrate 100 and the second support roll 544, the transfer direction of the substrate 100 may be shifted before and behind the second support roll 544. The case where the transfer direction of the substrate 100 is shifted means that the substrate 100 is curved at a predetermined angle based on the second support roll 544 when viewed from the side as illustrated in FIG. 6. When the transfer direction of the substrate 100 is shifted by the second support roll 544, a contact area between the substrate 100 and the second support roll 544 is increased to improve the frictional force. The contact area between the substrate 100 and the second support roll 544 is increased and thus a slip of the substrate 100 does not occur during rotating of the second support roll 544, and the substrate 100 may be smoothly transferred in a rotation direction of the second support roll 544. In this case, the transfer direction of the substrate 100 may be shifted at various angles, but is preferably shifted at 90 degree or more as illustrated in FIG. 6. As the shifted angle of the transfer direction of the substrate 100 is increased, there is an advantage in that it is possible to stably transfer the substrate 100.

Meanwhile, as described above, the cleaning member 462 contacts the surface of the resin layer 120 to remove the residue 135 of the electrode material 132. In this case, in order to effectively remove the residue 135 of the electrode material 132, the cleaning member 462 may contain a cleaning solution. The cleaning solution may be, for example, a mixture of isopropyl alcohol (IPA) and acetone having a mixture ration of 9:1 to 8:2. The cleaning solution serves to soften the residue 135 of the electrode material 132 which remains on the surface of the resin layer 120.

At least two cleaning units 460 may be provided in series in the transfer direction of the substrate 100. In the case of the exemplary embodiment, in the cleaning unit 460, a first cleaning unit 460a, a second cleaning unit 460b, and a third cleaning unit 460c are provided in series in the transfer direction of the substrate 100, and the first cleaning unit 460a, the second cleaning unit 460b, and the third cleaning unit 460c are disposed along an outer periphery of the second support roll 544. In this case, the cleaning solution is contained in the cleaning member 462 of the first cleaning unit 460a which is disposed at the foremost side, but the cleaning solution may be contained or not be contained in the cleaning members 462 of the second cleaning unit 460b and the third cleaning unit 460c which are disposed at the rear side. The first cleaning unit 460a coats the cleaning solution on the surface of the resin layer 120 to soften the residue 135 of the electrode material 132 which remains on the surface of the resin layer 120. The second cleaning unit 460b is disposed at the rear of the first cleaning unit 460a to wipe the residue 135 of the electrode material 132 remaining on the surface of the resin layer 120 which is softened by the first cleaning unit 460a. The third cleaning unit 460c which is disposed at the rear of the second cleaning unit 460b removes the remaining cleaning solution which is not wiped by the second cleaning unit 460b after being coated on the surface of the resin layer 120 by the first cleaning unit 460a. The cleaning solution is completely removed by the third cleaning unit 460c to prevent a spot from being generated in the touch screen panel and prevent the second roll 550 from being contaminated by the cleaning solution. As such, when at least two cleaning units 460 are provided in series in the transfer direction of the substrate 100, the residue 135 of the electrode material 132 remaining on the surface of the resin layer 120 may be removed several times. Accordingly, when at least two cleaning units 460 are provided in series in the transfer direction of the substrate 100, the residue 135 of the electrode material 132 may be sufficiently removed as compared with the case only one cleaning unit 460 is provided. In the case where only one cleaning unit 460 is provided, the cleaning unit 460 needs to apply a large pressure to the substrate 100 in order to completely remove the residue 135 of the electrode material 132, but in the case where a plurality of cleaning units 460 is provided, the residue 135 of the electrode material 132 may be removed several times and as a result, an excessively large pressure does not need to be applied to the substrate 100. Accordingly, it is possible to prevent the substrate 100 from being damaged or deformed.

Figure 9:
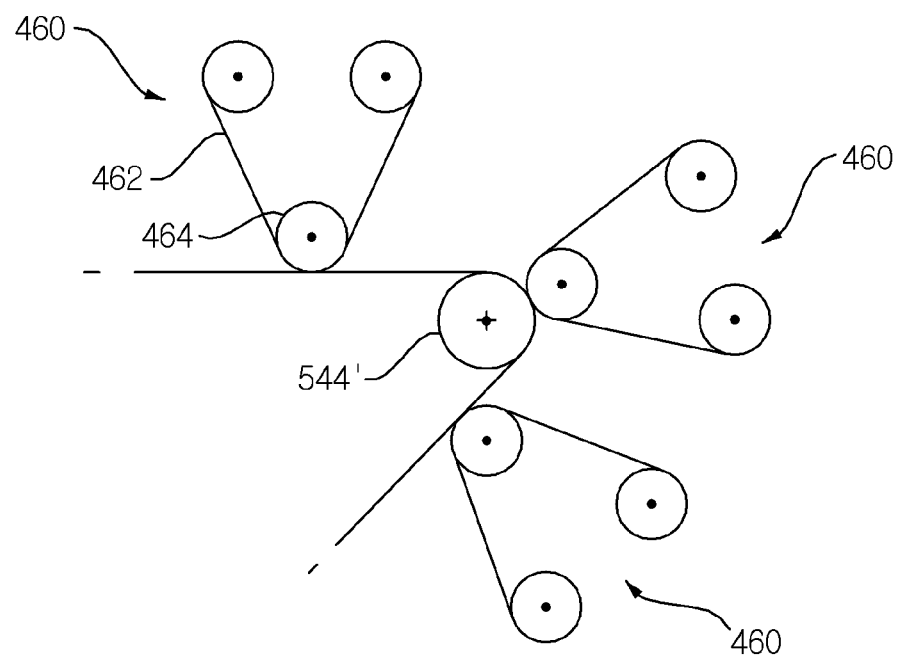
FIG. 9 is a diagram illustrating a state where a substrate is not supported by a second support roll at a point where a cleaning member and the substrate contact each other because a diameter of the second support roll is not sufficiently large.

Here, in the case where at least two cleaning units 460 are provided in series in the transfer direction of the substrate 100, a diameter of the second support roll 544 may be sufficiently large so as to stably support the substrate 100. FIG. 9 is a diagram illustrating a state where the substrate is not supported by a second support roll at a contact point of the cleaning member and the substrate because a diameter of the second support roll is not sufficiently large. As illustrated in FIG. 9, in the case where a diameter of a second support roll 544' is not sufficiently large, since a length of a contact surface of the substrate 100 and the second support roll 544' is short, the cleaning guide roll 464 may not be disposed in the contact surface of the substrate 100 and the second support roll 544'. In this case, since the substrate 100 is not supported by the second support roll 544' at a point where the cleaning member 462 contacts the substrate 100 by the cleaning guide roll 464, the substrate 100 is not in close contact with the cleaning guide roll 464 and thus the cleaning is not performed well, or the substrate 100 may be deformed or damaged by the cleaning guide roll 464.

Accordingly, as illustrated in FIG. 6, the diameter of the second support roll 544 may be sufficiently larger than that of the cleaning guide roll 464 so that the contact point of the cleaning member 462 and the substrate 100 is positioned in the contact surface of the substrate 100 and the second support roll 544. In this case, a diameter ratio of the second support roll 544 and the cleaning guide roll 464 is preferably about 2 to 7:1 and more preferably 5 to 7:1. Here, in the case where the diameter ratio of the second support roll 544 to the cleaning guide roll 464 is less than 2, as illustrated in FIG. 9, since the plurality of cleaning guide rolls 464 is difficult to be in contact with the circumference of the second support roll 544, cleaning force of the cleaning unit is reduced and as a result, a defect in a completed substrate may occur. In the case where the diameter ratio of the second support roll 544 to the cleaning guide roll 464 is more than 7, since a contact area of the substrate 100 and the second support roll 544 is increased, there is an advantage in that it is possible to effectively transfer the transfer force to the substrate 100, but there are disadvantages in that the second support roll 544 occupies too much space and a manufacturing cost of the second support roll 544 is increased. On the contrary, in the case where the diameter ratio of the second support roll 544 to the cleaning guide roll 464 is in the range of 2 to 7, the contact area of the substrate 100 and the second support roll 544 may be ensured so that sufficient transfer force may be transferred to the substrate 100. Therefore, although the substrate 100 contacts the plurality of cleaning units during cleaning of the substrate 100, the transfer speed of the substrate 100 may be uniformly maintained in each cleaning unit, and in the case where the diameter ratio of the second support roll 544 to the cleaning guide roll 464 is in the range of 5 to 7, since the contact area of the substrate 100 and the second support roll 544 is further increased, larger transfer force may be supplied to the substrate 100.

Figure 10:
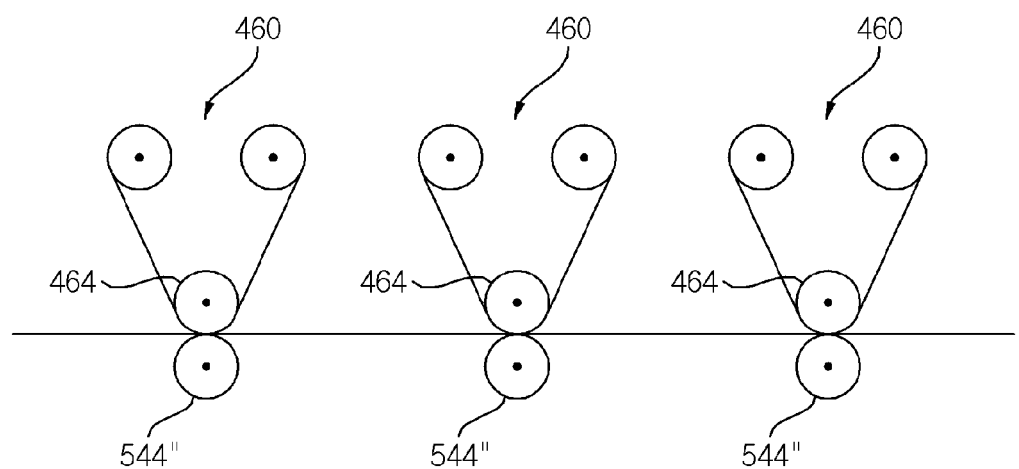
FIG. 10 is a diagram illustrating another example in the case where two or more cleaning units are provided in series in a transfer direction of a substrate.

Meanwhile, in another exemplary embodiment of the case where at least two cleaning units 460 are provided in series in the transfer direction of the substrate 100, as illustrated in FIG. 10, a second support roll 544" may be configured to be provided at the same number as the cleaning unit 460. In the case where the second support roll 544" is provided with the same number as the cleaning unit 460, since only one cleaning guide roll 464 contacts one second support roll 544", a diameter of the second support roll 544" may become smaller, and since the plurality of cleaning units 460 does not need to be disposed along the outer periphery of the second support roll 544", the installation position of the cleaning units 460 may be freely selected. However, since a plurality of second support rolls 544" is required and the plurality of second support rolls 544" needs to be individually controlled, the configuration of the apparatus is complicated as compared with the exemplary embodiment illustrated in FIG. 6 and the transfer direction of the substrate 100 is not shifted at the second support roll 544" and thus sufficient transfer force is difficult to be supplied to the substrate 100 due to reduction of the contact area between the substrate 100 and the second support roll 544".

As such, the configuration of the cleaning unit is not limited to the exemplary embodiment illustrated in FIG. 6 and may be modified in various forms. As one example thereof, the configuration of the cleaning unit may also be implemented like the exemplary embodiment illustrated in FIGS. 9 and 10, but by the same reason as described above, the exemplary embodiment illustrated in FIG. 6 may be the most preferable exemplary embodiment, in which the transfer direction of the substrate 100 is shifted before and behind the second support roll 544, and the diameter of the second support roll 544 is sufficiently large so that the contact point of the cleaning member 462 and the substrate 100 is positioned in the contact surface of the substrate 100 and the second support roll 544.

Figure 11:
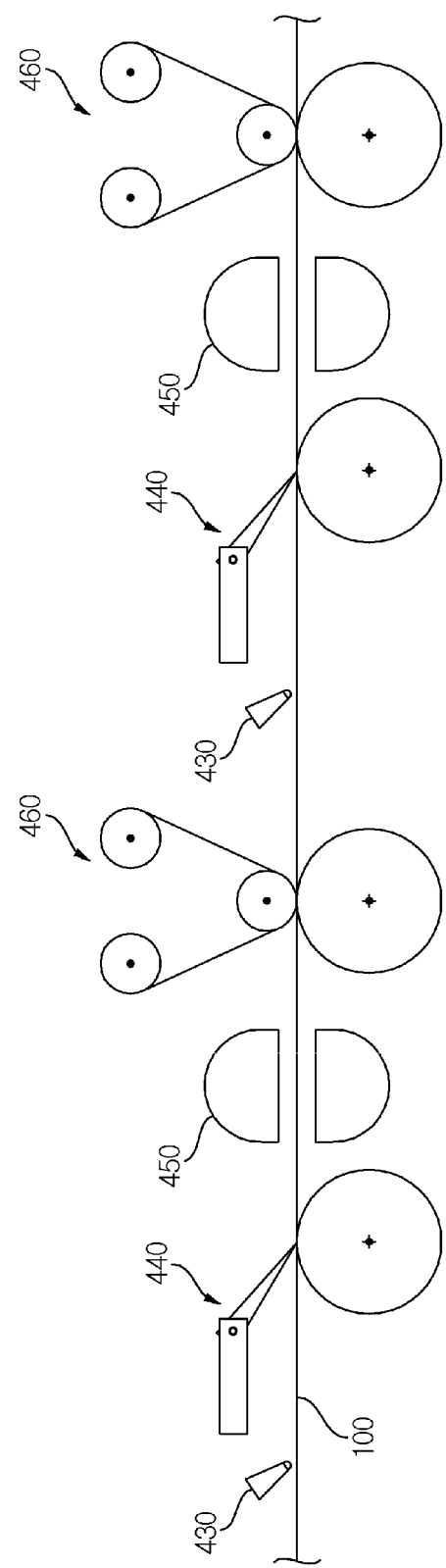
FIG. 11 is a diagram illustrating an example in which a plurality of sets including an electrode material coating unit, an electrode material sweeping unit, a curing unit, and a cleaning unit is provided in a transfer direction of a substrate.

Meanwhile, like a case where the electrode pattern 130 formed on the touch screen panel intends to be made of different materials in a height direction, or a case where a sufficient amount of electrode material 132 is not filled in the engraved pattern 122 through one coating, if necessary, a plurality of sets including the electrode material coating unit 430, the electrode material sweeping unit 440, the curing unit 450 and the cleaning unit 460 may be provided in the transfer direction of the substrate 100 as illustrated in FIG. 11, and thus electrode material 132 layers having the same number as the sets are sequentially laminated in the engraved pattern 122.

For example, in the case where two layers of the lower part of the electrode pattern 130 are laminated with silver and the uppermost layer is laminated with carbon black, three sets are installed in series in the transfer direction of the substrate 100. When the substrate 100 passes through the sets while being transferred, the silver 136 is filled in the engraved pattern 122 through processes in which first, silver 136 is coated on the resin layer 120 and then the silver 136 is filled in the engraved pattern 122, and the filled silver 132 is cured and then the residue 135 of the electrode material 132 remaining on the surface of the resin layer 120 is removed (see FIG. 8A). While the substrate 100 is continuously transferred, a series of processes as described above are performed with respect to the silver 136 and the carbon black 137, and the silver 136, the silver 136, and the carbon black 137 are sequentially laminated from the lower part in the engraved pattern 122 to form the electrode pattern (see FIGS. 8B and 8C).

Meanwhile, in the case where the lower layer of the electrode pattern 130 is laminated with silver and the upper layer is laminated with carbon black, two sets are installed in series in the transfer direction of the substrate 100. As such, in the case where the electrode material is formed in two layers, the processes may be reduced and visibility may be decreased as compared with the case where the electrode material is formed in three layers.

Hereinafter, an operational process of the apparatus for manufacturing a touch screen panel according to the exemplary embodiment will be described with reference to the aforementioned constituent elements.

First, the substrate 100 rewound on the first roll 520 is guided by the guide rolls 530a, 530b, and 530c to be transferred to the second roll 550 side. While the substrate 100 is transferred, first, the electrode material 132 is coated on the resin layer 120 of the substrate 100 by the electrode material coating unit 430. The substrate 100 coated with the electrode material 132 is transferred to pass through the electrode material sweeping unit 440. The electrode material sweeping unit 440 contacts the substrate 100 at a predetermined angle to pressurize the substrate 100. The electrode material 132 coated on the resin layer 120 is uniformly filled in the engraved pattern 122 of the resin layer 120 by the pressure between the electrode material sweeping unit 440 and the second guide roll 530b (see FIG. 7A). While the substrate 100 is transferred, the electrode material 132 on the surface of the resin layer 120 except for the electrode material 132 filled in the engraved pattern 122 of the resin layer 120 is almost removed by the electrode material sweeping unit 440 (see FIG. 7B). The electrode material 132 filled in the engraved pattern 122 of the resin layer 120 is cured by heat, hot-wind, infrared or near-infrared which is emitted from the curing unit 450. After the electrode material 132 is cured by the curing unit 450, the substrate 100 passes through the cleaning unit 460. The residue 135 of the electrode material 132 which remains on the surface of the resin layer 120 is completely removed by the cleaning unit 460 (see FIG. 7C). The touch screen panel completed after passing through the cleaning unit 460 (see FIG. 7D) is finally rewound on the second roll 550.

In the aforementioned exemplary embodiment of the present invention, as a state where the substrate 100 and the completed touch screen panel 10 are connected with each other, a name is classified according to whether the electrode pattern 130 is formed according to the exemplary embodiment of the present invention.

Figure 5:
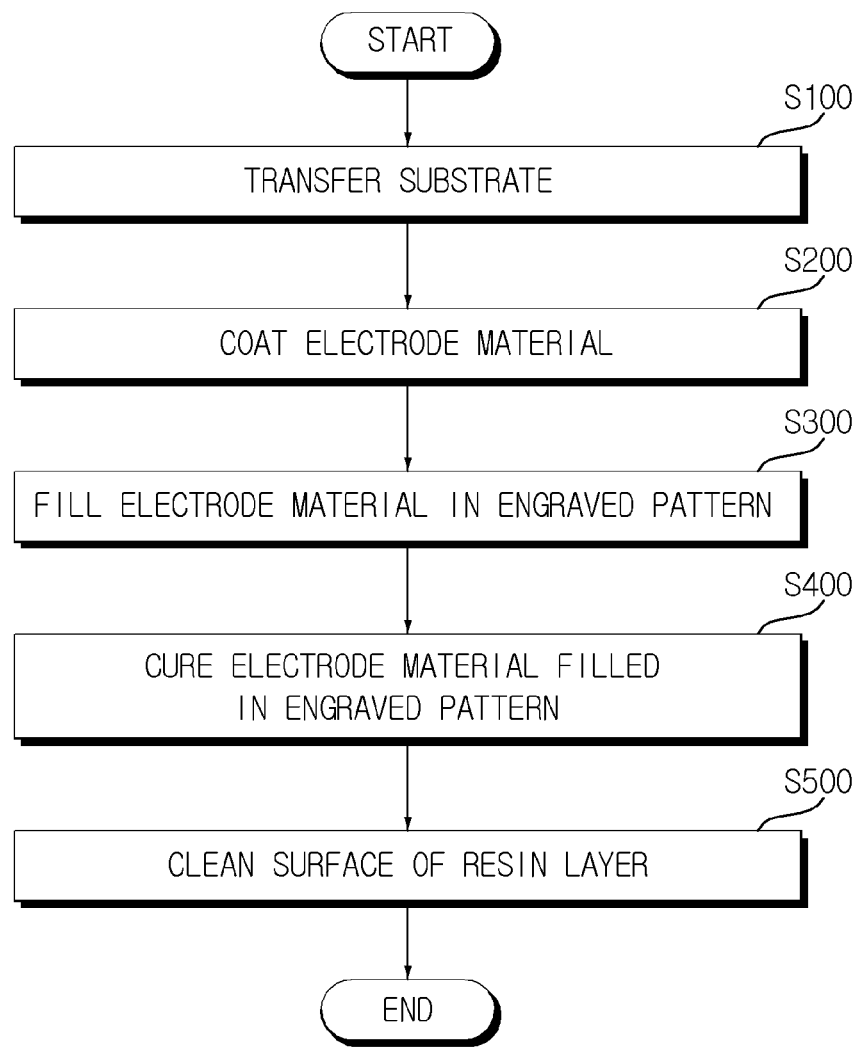
FIG. 5 is a flowchart of the method for manufacturing a touch screen panel according to the exemplary embodiment of the present invention.
Figure 7A:
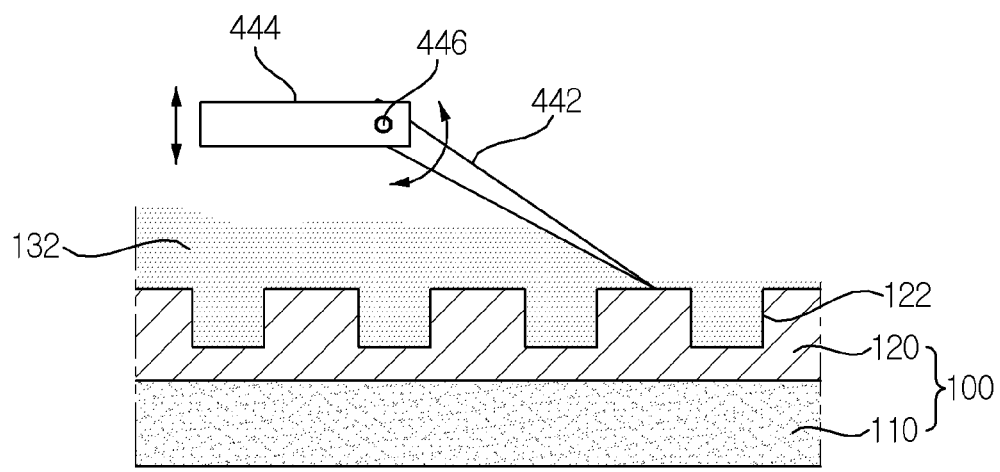
FIGS. 7A to 7D are enlarged views of parts A, B, C, and D of FIG. 6, respectively.
Figure 7B:
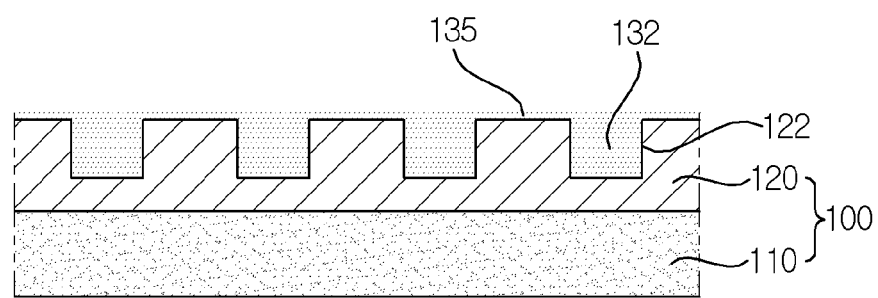
Figure 7C:
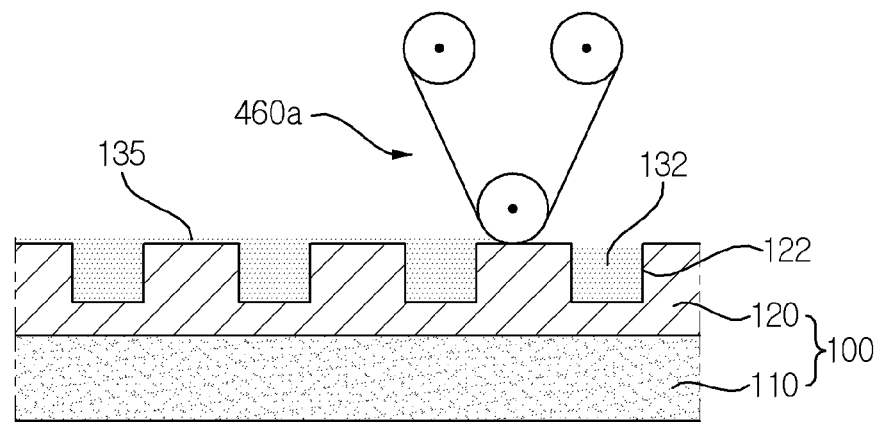
Figure 7D:
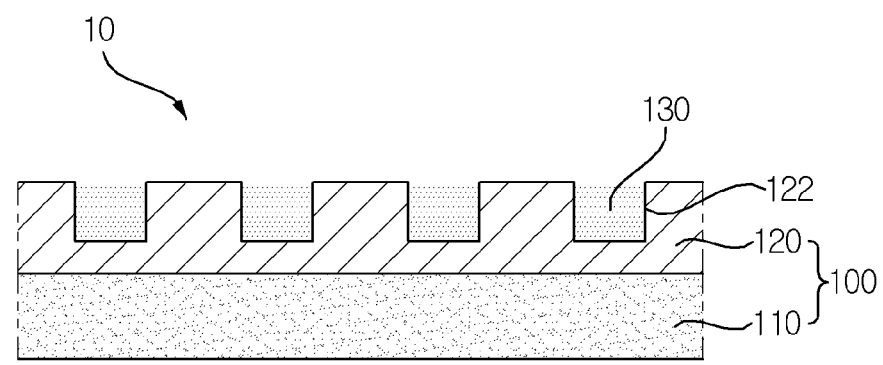

FIG. 5 is a flowchart of a method for manufacturing a touch screen panel according to the exemplary embodiment of the present invention.

Next, a method for manufacturing a touch screen panel according to the exemplary embodiment of the present invention will be described.

The method for manufacturing a touch screen panel according to the exemplary embodiment of the present invention includes transferring a substrate from a first roll to a second roll (S100), coating an electrode material on a resin layer of the substrate transferred to the second roll by an electrode material coating unit (S200), pushing the electrode material on the surface of the resin layer of the electrode material coated on the resin layer of the substrate by an electrode material sweeping unit in an opposite direction to a transfer direction of the substrate to fill the pushed electrode material in an engraved pattern (S300), curing the electrode material filled in an engraved pattern of the resin layer of the substrate (S400), and removing a residue of the electrode material remaining on the surface of the resin layer by cleaning the surface of the resin layer by a cleaning unit (S500). First, the substrate 100 is transferred from the first roll 520 to the second roll 550 (S100). In the present invention, the substrate 100 is transferred and rewound from the first roll 520 to the second roll 550 by a roll-to-roll method. In other words, with rolls provided at both sides, the substrate 100 rewound on one roll is unwound and transferred to be rewound on the other roll again.

While the substrate 100 is transferred, the electrode material 132 is coated on the resin layer 120 (S200). When the electrode material 132 is coated on the resin layer 120, a part of the electrode material 132 is filled in the engraved pattern 122, and the rest of the electrode material 132 remains on the surface of the resin layer 120. When the substrate 100 coated with the electrode material 132 is continuously transferred, the electrode material 132 reaches the electrode material sweeping unit 440. In this case, the electrode material 132 on the surface of the resin layer 120 of the electrode material coated on the resin layer 120 is blocked by the electrode material sweeping unit 440 to be not transferred together with the substrate 100 in a transfer direction of the substrate 100 and thus is pushed in an opposite direction to the transfer direction of the substrate 100. The electrode material 132 on the surface of the resin layer 120 is relatively pushed to the rear of the substrate 100 by the electrode material sweeping unit 440 to be filled in the engraved pattern by a pressure applied by the electrode material sweeping unit 440 (S300). When the substrate 100 passes through the electrode material sweeping unit 440, the electrode material 132 is filled in the engraved pattern 122 and only the residue 135 of the electrode material 132 remains on the surface of the resin layer 120. Thereafter, the electrode material 132 filled in the engraved pattern 122 of the resin layer 120 is cured (S400) and then the surface of the resin layer 120 is cleaned to remove the residue 135 of the electrode material 132 remaining on the surface of the resin layer 120 (S500). As a result, the electrode material 132 filled in the engraved pattern 122 forms the electrode pattern 130.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

The invention claimed is:

1. An apparatus for manufacturing a touch screen panel, wherein the touch screen panel includes a substrate with an electrode pattern, the substrate including a resin layer that has an engraved pattern, the electrode pattern being disposed on the engraved pattern, the apparatus comprising:
a first roll around which the substrate is wound;
a second roll around which the substrate with the electrode pattern is wound;
a guide roll disposed on a transfer path of the substrate between the first roll and the second roll and configured to guide transfer of the substrate;
an electrode material coater disposed between the first roll and the second roll and over the transfer path of the substrate, the electrode material coater being configured to coat an electrode material on a surface of the substrate;
an electrode material sweeper disposed between the electrode material coater and the second roll and configured to push a portion of the coated electrode material on the surface of the substrate and to fill the engraved pattern with the pushed portion of the electrode material by contacting the surface of the substrate and applying a predetermined pressure to the substrate;
a first cleaner configured to soften a residue of the electrode material that remains on the surface of the substrate by coating a cleaning solution on the surface of the substrate, the first cleaner including a cleaning guide roll and a cleaning member, the cleaning member containing the cleaning solution that is a mixture of isopropyl alcohol and acetone;
a second cleaner disposed between the first cleaner and the second roll and configured to wipe the softened residue of the electrode material; and
a support roll installed opposite to the cleaning guide roll such that the substrate is pressed between the support roll and the cleaning guide roll, the support roll being configured to support the substrate pressed by the cleaning guide roll,
wherein a diameter of the support roll is larger than a diameter of the cleaning guide roll, and
wherein the first cleaner and the second cleaner are disposed in series along a periphery of the support roll.

2. The apparatus of claim 1, wherein the support roll is a first support roll, the apparatus further comprising:
a second support roll installed opposite to the electrode material sweeper such that the substrate is pressed between the electrode material sweeper and the second support roll, the second support roll being configured to support the substrate pressed by the electrode material sweeper.

3. The apparatus of claim 1, wherein the electrode material sweeper includes a blade that has a front end, the front end of the blade contacting the substrate at a predetermined angle when viewed in a cross-section of the substrate that is parallel to a lengthwise direction of the substrate.

4. The apparatus of claim 3, wherein the electrode material sweeper further includes a blade arm that is installed to be movable in a direction perpendicular to the lengthwise direction of the substrate, and the blade is coupled with a rotation shaft provided in one end portion of the blade arm.

5. The apparatus of claim 1, further comprising:
a curer installed between the electrode material sweeper and the support roll, the curer being configured to cure the electrode material filled in the engraved pattern.

6. The apparatus of claim 5, wherein the curer cures the electrode material by transferring heat, hot-wind, infrared light, or near-infrared light to the filled portion of the electrode material in the engraved pattern.

7. The apparatus of claim 5, further comprising:
the first and second cleaners installed between the curer and the second roll.

8. The apparatus of claim 1, wherein the first cleaner further includes a first cleaning roll and a second cleaning roll around which both ends of the cleaning member are wound.

9. The apparatus of claim 1, wherein a portion of the substrate is curved such that the curved portion of the substrate contacts a portion of the periphery of the support roll and has a predetermined central angle corresponding to the curved portion of the substrate.

10. The apparatus of claim 1, further comprising a third cleaner installed between the second cleaner and the second roll and configured to remove a remaining portion of the cleaning solution.

11. The apparatus of claim 1,
wherein a contact point of the cleaning member and the substrate is positioned on a contact surface of the substrate and the support roll.

12. The apparatus of claim 1, wherein a diameter ratio of the support roll and the cleaning guide roll is in a range from 2:1 to 7:1.

13. The apparatus of claim 1, wherein the support roll is a first support roll, the cleaning guide roll is a first cleaning guide roll, the cleaning member is a first cleaning member, and the second cleaner includes a second cleaning guide roll and a second cleaning member, the apparatus further comprising:
a second support roll installed at an opposite side of the second cleaning guide roll such that the second cleaning member is pressed between the second cleaning guide roll and the substrate and the second support roll is configured to support the substrate pressed by the second cleaning guide roll.

14. The apparatus of claim 1, wherein the substrate further includes a base film having a predetermined transparency, and wherein the resin layer is disposed on the base film.

15. The apparatus of claim 1, wherein a first portion of the substrate contacts a first portion of the periphery of the support roll and a corresponding portion of the first cleaner, and wherein a second portion of the substrate contacts a second portion of the periphery of the support roll and a corresponding portion of the second cleaner.

16. The apparatus of claim 9, wherein the predetermined central angle is equal to or greater than 90 degrees.

\* \* \* \* \*